United States Patent [19]

Baus et al.

[11] Patent Number: 4,514,623
[45] Date of Patent: Apr. 30, 1985

[54] AUTOMATIC TELLER MACHINE WITH ENTRANCE ADAPTED TO PREVENT ACCESS BY FOREIGN OBJECTS

[75] Inventors: Rene Baus, Palos Verdes; Fred W. Schmidt, Mission Viejo, both of Calif.

[73] Assignee: American Magnetics Corporation, Carson, Calif.

[21] Appl. No.: 456,733

[22] Filed: Jan. 10, 1983

[51] Int. Cl.³ .............................................. G06K 13/00
[52] U.S. Cl. .................................... 235/482; 235/449; 235/483
[58] Field of Search ............... 235/449, 483, 485, 486, 235/482; 360/2

[56] References Cited

U.S. PATENT DOCUMENTS

| 3,979,578 | 9/1976 | McCullough et al. | 235/483 X |
| 4,037,703 | 7/1977 | Michaud et al. | 235/483 X |
| 4,213,039 | 7/1980 | Schasser | 235/449 |
| 4,322,613 | 3/1982 | Oldenkamp | 235/449 |

Primary Examiner—David L. Trafton
Attorney, Agent, or Firm—Bromberg, Sunstein & McGregor

[57] ABSTRACT

An Automatic Teller Machine is adapted to block the acceptance of foreign objects. A blocking member is misaligned with an entrance slot except when sensors signal the presence of an object which meets established criteria. In the presence of the signals, the blocking member is moved into alignment with the slot permitting passage of the conforming objects.

8 Claims, 6 Drawing Figures

AUTOMATIC TELLER MACHINE WITH ENTRANCE ADAPTED TO PREVENT ACCESS BY FOREIGN OBJECTS

FIELD OF THE INVENTION

This invention relates to card-operated electronic devices such as automatic teller machines (ATM's) and the like, and more particularly to a gate assembly for accepting subscriber cards for carrying out desired banking procedures automatically.

BACKGROUND OF THE INVENTION

An ATM is a familiar feature of most banking facilities, introduced for allowing bank depositors access to their accounts after banking hours. Access to a particular account is permitted by such a machine in response to a magnetic code encoded on a magnetic stripe on the card. The card is introduced, at a slot in the face of the ATM, to a tray along which the card is moved past read and write heads. The read and write heads decode and encode the magnetic stripe respectively.

Although ATM's are extremely important machines and their use is increasing, they are hard to maintain in operating condition. The main reason for the maintenance problem is the introduction of unauthorized items into the machine at the card input slot. These items, such a sticks and knives, get jammed in the card-receiving mechanism and could even cause damage to the card writing and reading apparatus.

The problem to which the present invention is directed is to provide an ATM which will accept only legitimate cards thus eliminating the possibility of access to the ATM by items other then authorized cards.

BRIEF DESCRIPTION OF THE INVENTION

The foregoing problem is overcome by an ATM having an input gate assembly which includes a first slot in its exposed face with a rotatable blocking member blocking the slot. The blocking member includes a second slot which permits passage of a card only when the two slots are aligned with one another. The ATM includes edge sensors and a magnetic code sensor located in prescribed spatial positions between the two slots. The alignment of the two slots occurs only in the presence of signals indicating that an item at the first slot is of the prescribed dimensions and has an acceptably encoded magnetic stripe in the proper location.

An ATM having a card-accepting gate assembly with at least first and second normally misaligned slots for denying access to the machine is considered a significant departure from prior art thinking. An ATM including sensors placed between the slots along with electronic circuitry responsive to such sensors for effecting the realignment is also considered a departure from prior art thinking.

DETAILED DESCRIPTION

Figure 1:
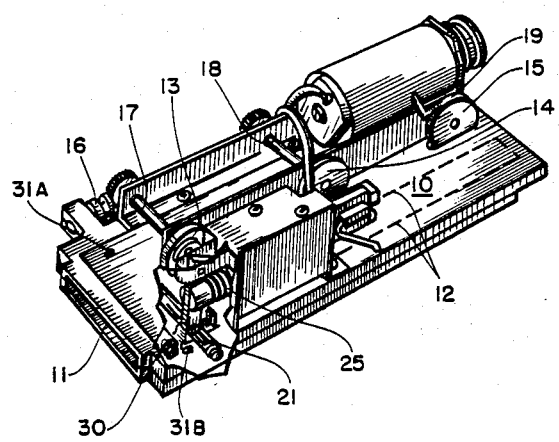
FIG. 1 is a plan view, partially cut away, of an ATM in accordance with this invention.

FIG. 1 shows a plan view of an automatic teller machine (ATM) 10. An ATM is mounted typically so that only a slot 11 of an input gate assembly is exposed to a customer for receiving a magnetic card. It is common also to have a key board (not shown) available to the customer for indicating the nature and amount of the transaction for the account indicated by code on the card.

A card inserted at slot 11 is moved along tray 12, shown in phantom, by wheels 13, 14 and 15. The wheels are rotated synchronously by a worm gear 16 which engages geared drive shafts 17, 18 and 19 connected to the wheels respectively. These wheels engage the card sequentially moving the card along the tray. The wheels are juxtaposed with three other wheels driven in a like manner be worm gear 16, which are located beneath the tray, as viewed, in a manner to engage the bottom of the card. The lower three wheels are not shown.

Figure 2:
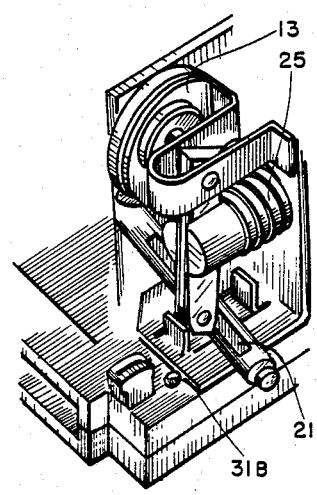
FIG. 2 is an enlarged plan view of a rotatable blocking member for the ATM of FIG. 1.

FIG. 2 shows details of a blocking member 20 in the input gate assembly. Blocking member 20 is located astride tray 12 and adjacent to slot 11. Member 20 has a slot 21 through it and is rotatable along 'ts axis by an arm assembly comprising arms 22 and 23. Arms 22 and 23 are free to pivot with respect to one another at elbow 24. Arm 23 is connected to solenoid 25 and is moved thereby between the closed position represented by FIG. 3 and the open position represented by FIG. 4 in response to signals generated by sensors located at slot 11.

Figure 3:
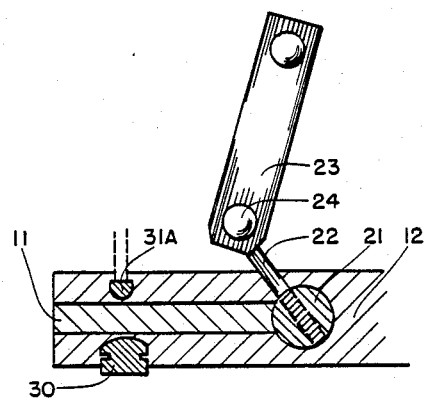
FIGS. 3 and 4 are side views of the rotatable blocking member of FIG. 1 in blocking and unblocking positions respectively.
Figure 4:
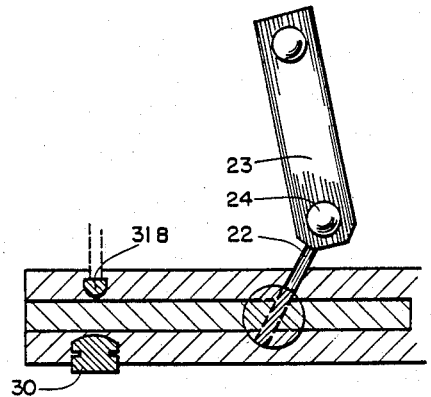

FIG. 3 shows sensors 30 and 31A and 31B positioned below and above tray 12 and at opposite sides of the tray as shown in FIG. 1. The sensors are adapted to provide a signal to solenoid (motor) 25 to rotate the blocking member to the position shown in FIG. 4 only if an object of prescribed width enters slot 11 and, then, only if a number of flux reversals are detected indicative of the presence of a magnetic stripe on a banking card.

Figure 5:
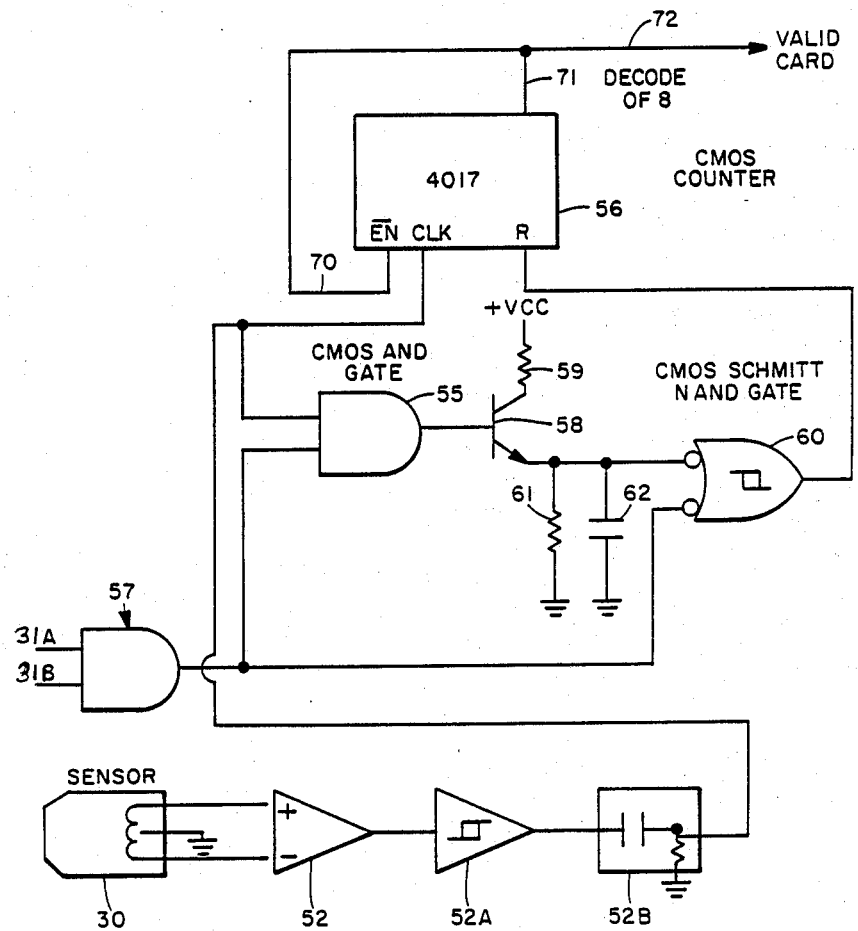
FIG. 5 is a circuit diagram for controlling the position of the rotating blocking member of FIG. 2.

FIG. 5 shows a circuit connected to sensors 30 and 31A and 31B for generating the proper command signals for rotating the blocking member. To this end, sensor 30 may by any magnetic detector head for detecting magnetic reversals whereas sensors 31A and 31B may, for example, be a pair of photodetectors which provide outputs when a light beam is interrupted by the card. Specifically, the output of sensor 30 is connected to an amplifier 52 which is connected to comparator 52A. Comparator 52A is connected, in turn, to differentiator 52B. The output of differentiator 52B is connected to an input to a CMOS AND gate 55 and to a clock input of a counter 56.

The outputs of sensors 31A and 31B are connected to first and second inputs of AND circuit 57. The output of circuit 57 is connected to a second input to gate 55. The output of gate 55 is connected to the base of (N-P-N Type) transistor 58. The collector of transistor 58 is connected to a power source via a resistor 59. The emitter of transistor 58 is connected to an input to a CMOS Schmitt NAND gate 60 and to ground via resistor 61 and capacitor 62 in a manner, as shown, to provide a time constant of 20 milliseconds. The output of AND circuit 57 also is connected to a second input of gate 60. The output of gate 60 is connected to the reset input of the counter. Output 71 of the counter is connected via line 72, through appropriate drive circuitry (not shown), to solenoid (motor) 25 for providing the control signal for rotating member 21 into the position shown in FIG. 4. Output 71 is also connected to counter enable 70.

Figure 6:
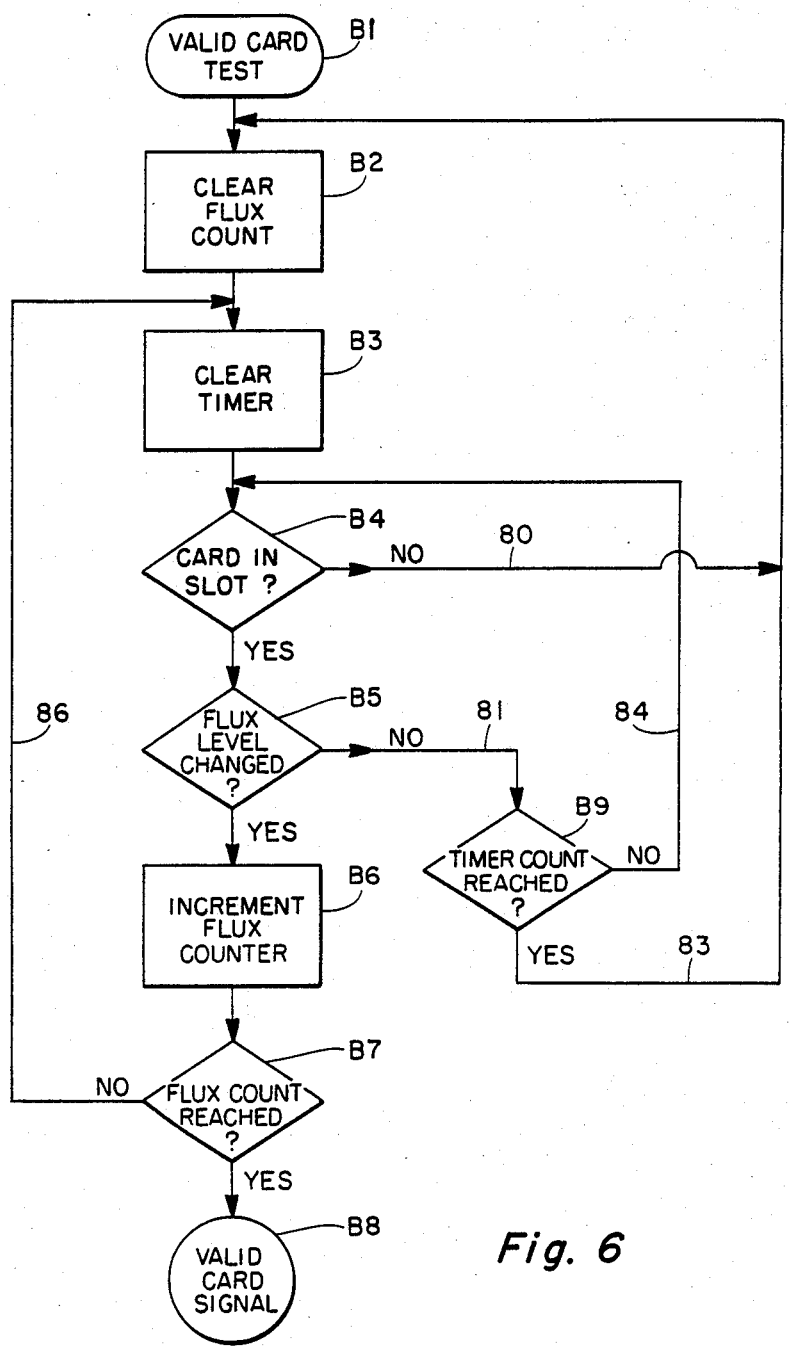
FIG. 6 is a flow diagram of the operation of the circuit of FIG. 5.

The operation of the circuit of FIG. 5 is described in conjunction with the flow chart of FIG. 6. The apparatus is readied for a "valid card" test upon completion of the next previous valid card test, as will become clear, by clearing counter 56 and clearing the timer, which comprises resistor 61 and capacitor 62. The operation is indicated by blocks B1, B2, and B3 of FIG. 6.

Block B4 indicates the presence of a card in slot 11. If a card is present, sensors 31A and 31B in conjunction with AND circuit 57 provide a signal indicating that the object is of proper width and gate 55 is enabled to accept flux level change indications from sensor 30. If flux level change indications are present, counter 56 increments as indicated by block B6 until a prescribed flux count is reached (e.g. eight flux reversal pairs as indicated by block B7). A valid card signal appears on output 71 for activating solenoid/motor 25 as indicated by block B8. Further flux reversals do not further advance the counter, which is held by feedback to counter enable 70.

Had the object at slot 11 not been of a proper width, gate 55 would not have been enabled, but gate 60 is operative to reset counter 56 and no "valid card" signal is generated. Even in the above described case, where a signal does appear on the output of AND circuit 57, if an insufficient number of flux reversals occur within the 20 msec time constant, gate 60 resets counter 56 and no "valid card" signal appears on line 70. The detection of each flux reversal pair restarts the 20 msec timer. In the absence of both signals from sensors 31A and 31B and the flux reversals, no "valid card" signal is generated and member 20 remains in the closed position shown in FIG. 3.

The case where sensors 31A and 31B signal the presence of an object of the proper width yet no flux reversals occur is represented in FIG. 6 by curved arrow 81 originating at block B5 and extending to block B9. If the time count is reached, operation returns to block B2 as indicated by curved arrow 83. If the count had not been reached, operation returns to block B4 as indicated by curved arrow 84.

In the case discussed in connection with block B7 where the flux count is not reached, no "valid card" signal appears, and operation returns to block B3 as indicated by curved arrow 86.

The separation between slot 11 and member 20 is small in the illustrative embodiment, being sufficiently large to allow the card to advance only enough to permit detection of the prescribed number of flux reversals. This separation is not critical and is chosen to allow proper placement of sensors and to permit limited advance of the card.

It will be apparent that although the invention has been disclosed in terms of magnetic stripe cards in an automatic teller machine, and a single blocking mechanism the method and apparatus of this invention may be advantageously adapted by one skilled in the art to other uses. For example the device may be employed in credit card vending machines, such as used by airlines to sell shuttle tickets, or may be used in industrial security or admission and access systems in which user entrance or machine access is by use of a magnetically coded card. In the latter use the card recognition circuitry could also trigger an alarm in the event the card fails to pass the recognition circuitry, B4, B5, B7 of the block diagram.

Further it will be understood that blocking member may be readiy adapted to sort cards with differing magnetic or dimensional traits into a plurality of trays, and that the recognition circuitry may be readily adapted to activate different read/write heads, in response to different codes or signals from the sensors 30, 31A and 31B. Also, while the invention has been described with reference to a wheel-driven card reading device it will be apparent that the invention is equally usable with card readers employing belt carriers or other drive means.

Accordingly while the invention has been described with particular reference to specific embodiments thereof it will be understood that it may be embodied in a variety of forms diverse from those shown without departing from the spirit and scope of the invention as defined by the following claims.

What is claimed is:

1. An apparatus for reading information from a portable information-bearing member, said member having a first dimension and including information at a first location in fixed spatial relationship with respect to said first dimension and being adapted to generate third signals when moved with respect to a detector, said apparatus comprising:

means for receiving said information-bearing member;

a member-receiving input gate assembly, said input gate assembly comprising at least first and second spaced apart slot-defining members for defining at least first and second spaced apart slots, said first and second slots being normally mis-aligned for denying access to said means for receiving of any item introduced to said first slot;

first and second sensor arrangements disposed between said first and second slots in a manner to generate first and second signals only in the presence of an item having said first dimension and having said information at said first location;

means responsive to said first and second signals for enabling said detector to detect a preset number of said third signals; and means responsive to said first and second signals and to the occurrence of the preset number of third signals for aligning said first and second slots in a manner to permit said item to pass to said means for receiving.

2. An apparatus in accordance with claim 1 wherein said portable information-bearing member comprises a card bearing a magnetic stripe, said stripe being adapted to have information written thereon, and wherein said apparatus comprises a card reader.

3. An apparatus in accordance with claim 2 further including means for writing information on said card.

4. An apparatus in accordance with claim 1 in which said first slot-defining member is in a fixed position and said means responsive to said first and second signals is operative to move said second slot-defining member in a manner to align said second slot with said first slot.

5. An apparatus in accordance with claim 4 wherein said second slot defining member is adapted to be rotated about an axis between first and second slot orientations, said first orientation being misaligned with said first slot for denying card access to said means for receiving, said second orientation being aligned with said first slot for permitting card access to said means for receiving.

6. An apparatus in accordance with claim 5 further comprising mechanical means connected to said second slot-defining member and responsive to said first and second signals for rotating said second slot-defining member to said second orientation.

7. An apparatus for controllably allowing passage of a card into a machine adapted to interact with coded information for operating a computer, said card bearing said coded information in a form to generate first signals when moved along an axis in energy coupling relationship to a detector, said apparatus including said detector and signal means responsive to the presentation of a valid card at an input gate assembly for enabling said detector to detect a preset number of said first signals within a preset time period, said apparatus further including an input gate assembly having first and second slot-defining members and a card-receiving member along which said card is moved for effecting said interaction, said first and second members being normally misaligned to prevent passage, said signal means being responsive to a valid card at said first member for aligning said first and second members for permitting passage.

8. An apparatus in accordance with claim 7 wherein said signal means includes first and second sensors adapted to detect the presence of a card of prescribed width and the presence of magnetic coding in a prescribed position on said card for generating said valid card signal.

* * * * *